(12) United States Patent
Roth (10) Patent No.: US 6,691,701 B1
(45) Date of Patent: Feb. 17, 2004

(54) MODULAR SOLAR RADIATION COLLECTION AND DISTRIBUTION SYSTEM

(76) Inventor: Karl Frederic Roth, 345 Indiana Ave., Venice, CA (US) 90291

( * ) Notice: Subject to any disclaimer, the term of this patent is extended or adjusted under 35 U.S.C. 154(b) by 0 days.

(21) Appl. No.: 10/213,490

(22) Filed: Aug. 6, 2002

Related U.S. Application Data
(60) Provisional application No. 60/311,693, filed on Aug. 10, 2001.

(51) Int. Cl.$^7$ ................................. F24J 2/18; F24J 2/16
(52) U.S. Cl. ........................ 126/685; 126/600; 126/686
(58) Field of Search ................................ 126/600, 617, 126/690, 685, 686

(56) References Cited

U.S. PATENT DOCUMENTS

| | | | | |
|---|---|---|---|---|
| 2,182,222 A | * | 12/1939 | Courtis et al. | 126/607 |
| 3,171,403 A | * | 3/1965 | Drescher | 126/603 |
| 4,249,511 A | * | 2/1981 | Krisst et al. | 126/608 |
| 4,266,179 A | * | 5/1981 | Hamm, Jr. | 322/2 R |
| 5,054,466 A | * | 10/1991 | White et al. | 126/690 |
| 5,195,503 A | * | 3/1993 | Ludlow | 126/600 |
| 5,529,054 A | * | 6/1996 | Shoen | 126/681 |
| 5,540,216 A | * | 7/1996 | Rasmusson | 126/683 |
| 6,128,135 A | | 10/2000 | Stiles | |
| 6,284,968 B1 | * | 9/2001 | Niesyn | 126/600 |
| 6,336,452 B1 | * | 1/2002 | Tirey, Jr. | 126/690 |

OTHER PUBLICATIONS

3M Radiant Light Film Product Information Packet USA © 2000, pp. 3,4.

* cited by examiner

*Primary Examiner*—Alfred Basichas
(74) *Attorney, Agent, or Firm*—Edward Gray (57) ABSTRACT

A solar radiation collection and distribution system includes a solar collection system which includes a primary reflector, a secondary reflector and a planar reflector. The focal points of the primary and secondary reflectors are offset by the same number of degrees, and the primary and secondary reflectors are rigidly fixed in an assembly such that their focal points lie along a common optical axis. The assembly is pivotable in elevation and rotatable in azimuth such that the primary reflector continuously tracks the sun. A pivotable planar reflector, which reflects downwardly the beam from the secondary reflector, pivots at one-half the angular rate at which the assembly pivots. This beam consists essentially of sunlight and is maintained in a substantially constant orientation independent of assembly elevation and azimuth. A distribution system for directing the beam from the planar reflector includes a lateral reflector and a plurality of sunlight distribution reflectors which each reflect downwardly a portion of the beam reflected by the lateral reflector.

17 Claims, 6 Drawing Sheets

MODULAR SOLAR RADIATION COLLECTION AND DISTRIBUTION SYSTEM

Priority of United States Provisional Application Ser. No. 60/311,693 filed Aug. 10, 2001 is hereby claimed.

BACKGROUND OF THE INVENTION

1. Field of the Invention

This invention relates to solar collectors, and more particularly to a solar collection and distribution system including a collector that tracks the sun in elevation and azimuth, and a distribution system that directs a beam of sunlight along a ceiling or rooftop.

2. Background Information

There are various arrangements for solar radiation collection, distribution and utilization. Most suffer numerous surface reflection loses are of impractical design, have insufficient visible light collection capability, and lack adaptability to diverse end-uses.

It might seem obvious to use a sun-tracking mirrored dish system to collect and transmit sunlight. Such a system could use a prime focus parabolic reflector, and a secondary reflector to focus the sunlight collected in a condensed, collimated beam back along the same axis through the primary reflector. The focused light could then reflect off a downward-directing planar reflector that would direct the light into a buildings or to an energy receiver. There must also be a means of effectively distributing the collected light and/or infrared radiation. There are, however, inherent problems and inefficiencies with such a prime focus three-reflector design, particularly at high sun elevations.

The first problem with a prime focus collector of such design is that to transmit most of a collimated beam at high sun elevations (using a practical beam diameter and concentration levels), the planar reflector must be of impractical length. With practical lengths, typically half of a beam's cross-section cannot be redirected by the planar reflector when the sun is nearly overhead. Using too small a beam diameter to increase the percentage of light captured and reflected at high sun elevations generally results in a concentration level so high that system materials are likely to degrade and also increases the risk of fire and other safety hazards.

Secondly, since the angle of incidence at the downward-directing planar reflector increases with increasing sun elevation, there are substantial surface reflection losses at high sun elevations when a standard reflecting material such as glass mirror is used for the planar reflector, in addition to undesirable spectral absorption characteristics and color shifting, even when a state of the art first surface specular reflecting material such as enhanced reflectivity anodized sheeting is used.

Thirdly, at high sun elevations, the cross-sections of a planar reflector and its supporting structure begin to occlude the collimated beam from the secondary reflector, significantly reducing system output and efficiency.

It is therefore a principal object and advantage of the present invention to minimize transmission losses in a solar radiation collection system at sun elevation angles above about 75°. It is a further object and advantage of the invention to provide a solar radiation collection and distribution system which maximally and efficiently collects, collimates, spectrally separates and distributes solar radiation at all latitudes and sun elevation angles, and is adaptable to multiple uses including illumination, heating, cooling, water purification, photobioreactors and electric power generation.

SUMMARY OF THE INVENTION

The invention provides a solar radiation collection and distribution system including a solar collection system which includes a primary reflector having an aperture, and a secondary reflector which redirects solar radiation received from the primary reflector in a concentrated beam through the aperture. The primary and secondary reflectors are rigidly disposed in a pivotable assembly. The beam has an exit angle with respect to the assembly which is different than the angle at which solar radiation is incident on the primary reflector. The solar collection system further includes means for pivoting the assembly in elevation at an angular rate such that the primary reflector continuously tracks the sun, and means for annularly rotating the assembly such that the primary reflector continuously tracks the sun in azimuth. The solar collection system further includes a pivotable planar reflector which receives and reflects downwardly the beam from the secondary reflector, and pivots at one-half the angular rate at which the assembly pivots. The downwardly reflected beam consists essentially of sunlight and is maintained in a substantially constant vertical and horizontal orientation independent of the elevational and azimuthal motion of the assembly. The invention further provides a distribution system which includes a lateral reflector which reflects the beam reflected from the planar reflector, and a plurality of reflectors which each reflect downwardly a portion of the beam reflected from the lateral reflector.

The above and other objects, advantages and novel features of the invention will be more fully understood from the following detailed description and the accompanying drawings, in which:

DETAILED DESCRIPTION OF THE PREFERRED EMBODIMENTS

As defined herein: the term "solar radiation" means radiation over the sun's total spectrum reaching the Earth, including infrared (IR), visible and ultraviolet (UV) components, the term "concentration level" means the amount of solar radiation per unit area, the terms "light beam" and "beam" are synonymous and mean a beam of solar radiation characterized by changing portions of visible, IR and UV radiation, depending on the particular segment of the total optical path traversed, the term "condensed beam" means a beam having a greater flux density than incident solar radiation: and the term "sunlight", where applied to a beam used for dayliphting applications, means that IR and UV have been substantially spectrally separated from the beam.

Figure 1:
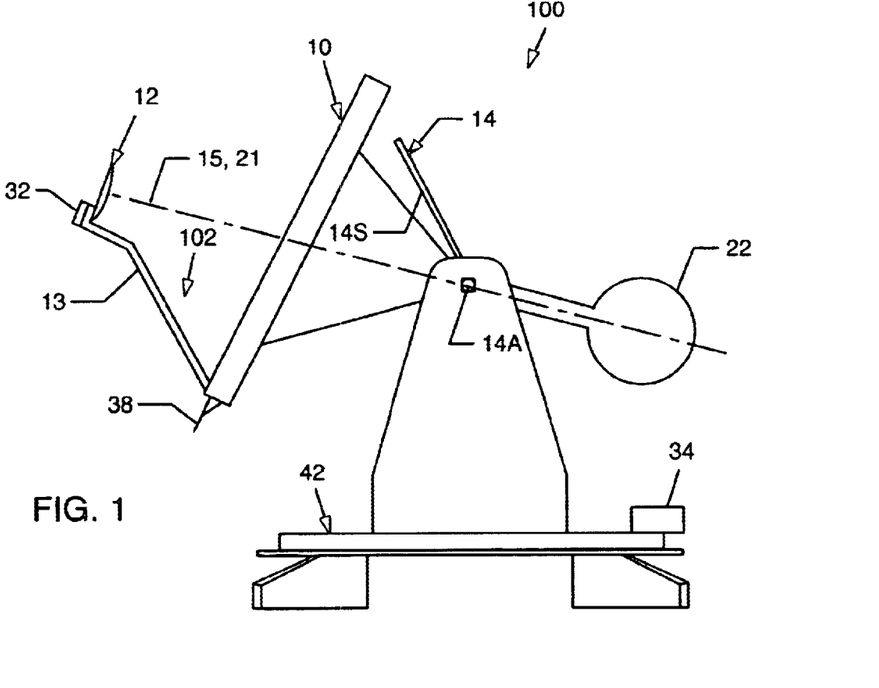
FIG. 1 is a side elevational view of a two-axis, sun-tracking solar radiation collection system according to the invention, including a primary reflector with an offset focal point and a secondary reflector having a focal point of equal offset so that the two focal points lie along a common optical axis, and a pivotable planar reflector.
Figure 2:
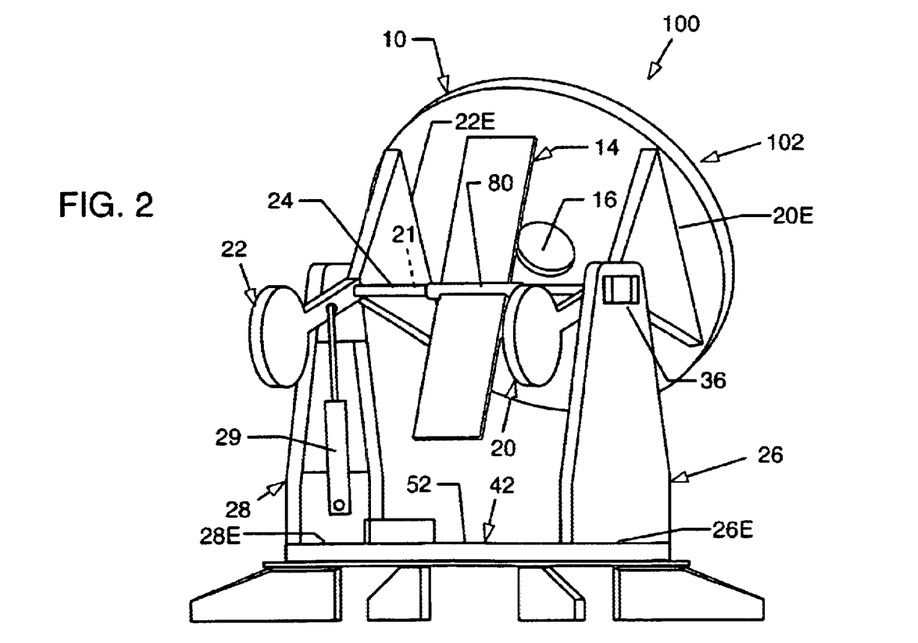
FIG. 2 is a rear 45-degree view of the FIG. 1 collection system.
Figure 3:
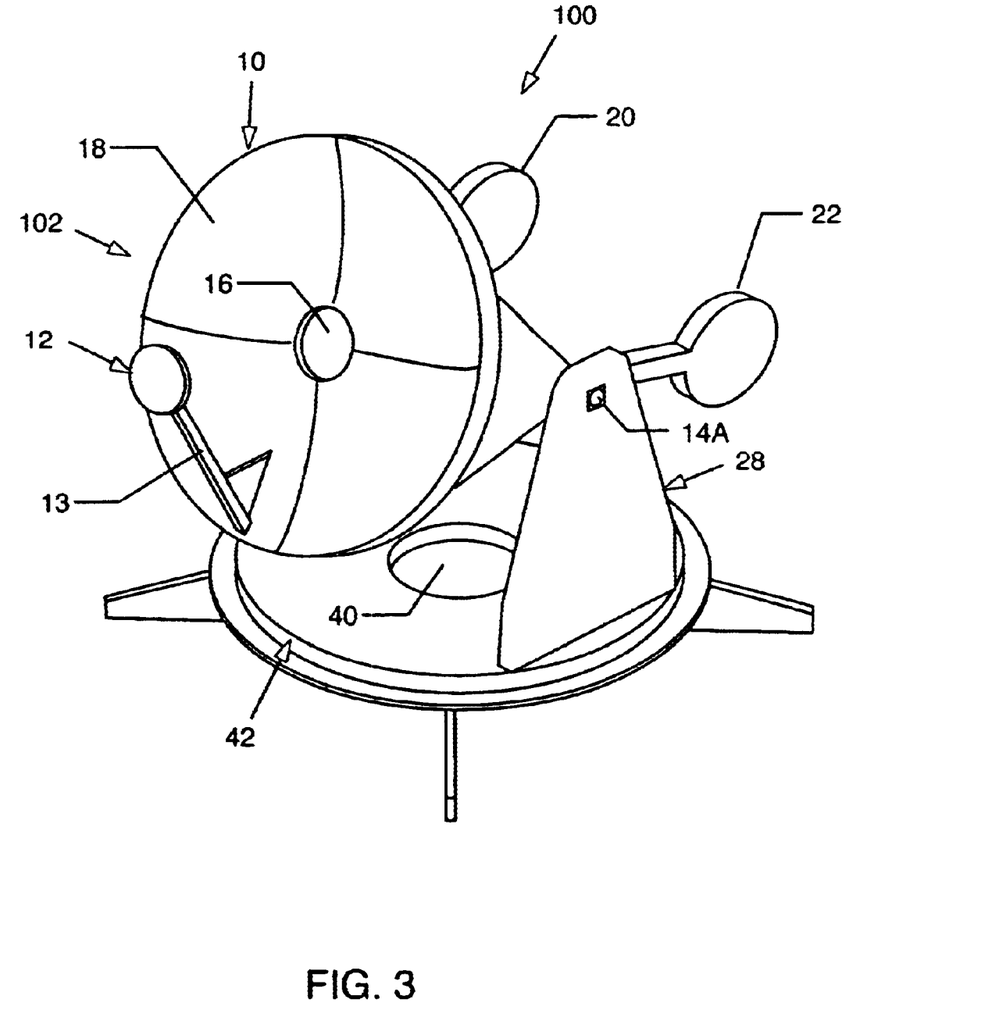
FIG. 3 is a front isometric view of the FIG. 1 collection system.

Referring to FIGS. 1, 2 and 3, a solar radiation collection and distribution system according to the invention includes a solar collection system 100 having a concave primary reflector 10 incorporating a downwardly offset focal point (i.e., a focal point offset from e the prime focus geometry optical axis), a secondary reflector 12, of lesser diameter and preferably having a complementary offset focal point on the same optical axis as the focal point of primary reflector 10, which maximally collimates light reflected from reflector 10, and a planar reflector 14 that reflects the collimated light beam from reflector 12 in a downward direction. Preferably, primary reflector 10 is concavely parabolic. Preferably, reflector 12 is convexly hyperbolic. As best shown in FIG. 1, primary and secondary reflectors 10 and 12 are rigidly attached by a support structure 13, thereby determining primary/secondary reflector assembly 102 in which they preferably share a common offset focal point optical axis 15 (see FIG. 4a). Secondary reflector 12 directs the non-diffuse light collected by primary reflector 10 through aperture 16 in primary reflector 10. Aperture 16 is of slightly greater dimension than the entering light beam to allow for transmission of scattered light rays. As shown in FIGS. 1 and 5, center-line 21 of counterweighted support arms 20 and 22 is preferably oriented to be coplanar with optical axis 15 of the collimated light beam reflected from reflector 12 through aperture 16. Such coplanar orientation is preferred because of compatibility with preferred mechanical acutation means.

Although reflectors 10 and 12 are conically shaped, alternative reflector surface shapes providing similar or improved performance in given situations are feasible, including a combinations of substantially spherical and conical shapes, multi-focal point shapes, and/or shapes providing prime and offset focal points.

Figure 4:
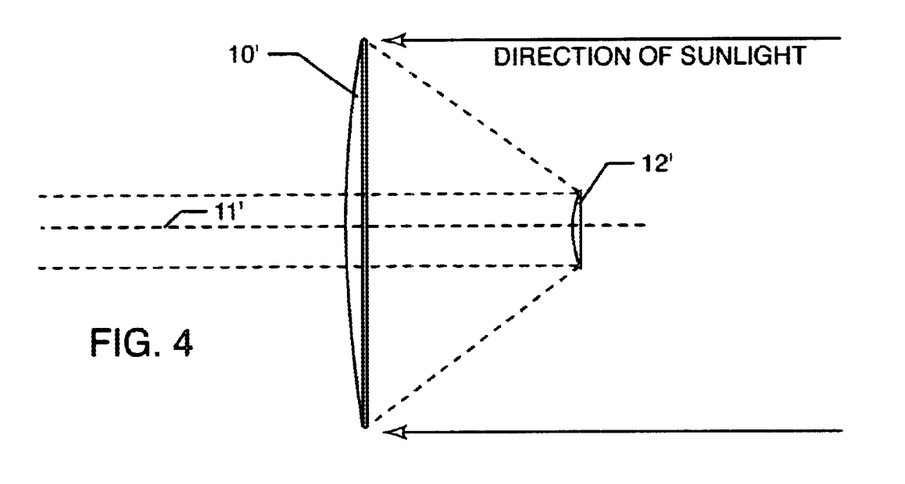
FIG. 4 illustrates a conventional prime focus optical configuration.
Figure 4A:
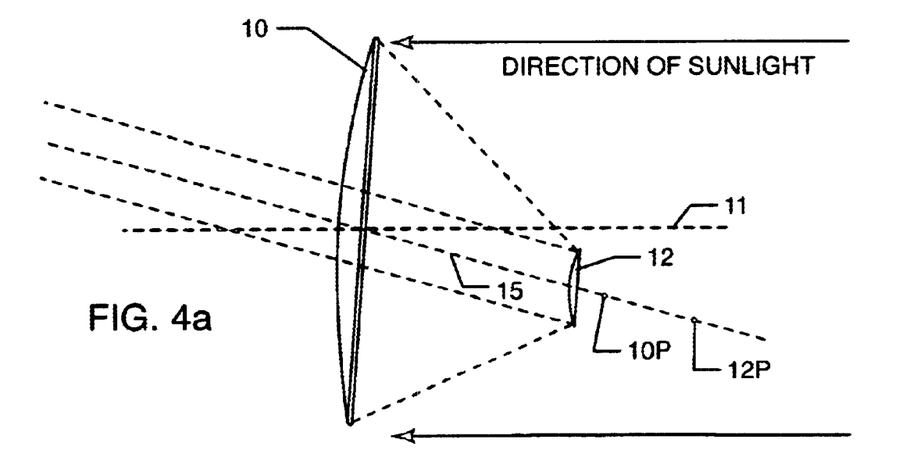
FIG. 4a illustrates an offset focal point configuration according to the invention.
Figure 5:
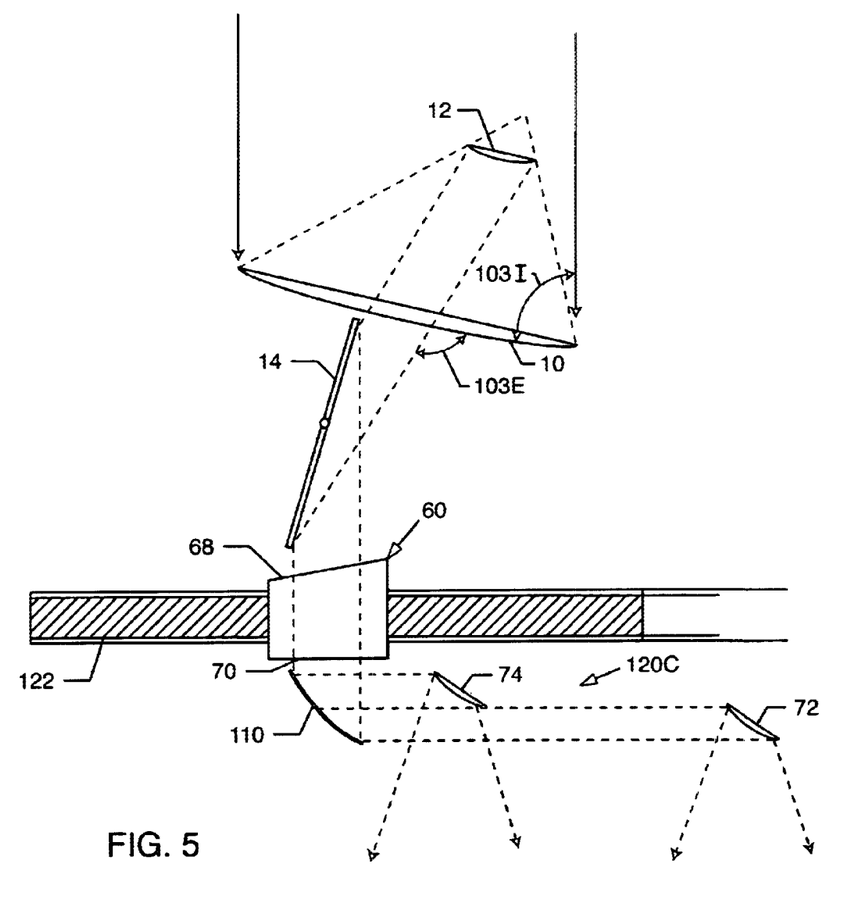
FIG. 5 shows an elevational view of the FIG. 1 primary, secondary and planar reflectors when the sun is at zenith, and a ceiling-mounted distribution system for distributing sunlight.

FIGS. 4 and 4a show, respectively, a conventional prime focus optical configuration, and the offset focal point configuration of the present invention. In FIG. 4, prime focus primary and secondary reflectors 10', 12', respectively are oriented perpendicular to central axis 11'. In FIG. 4a, focal points 10P, 12P, respectively, of primary reflector 10 and secondary reflector 12 are offset from central axis 11 along axis 15 by a predetermined number of degrees within a range of about 5° to about 45°, and preferably about 15° for a 12-inch diameter beam. As shown in FIG. 5, such offset of the focal points provides an exit angle 103E from assembly 102 different than the solar radiation incidence angle 103I for a prime focus configuration. Specifically, the focal point offsets ensure that the exit angle of the collimated beam sent to the planar reflector 14 is always less than 90° above the horizon when the sun elevation is 90° (i.e., directly overhead), so that a substantial portion of the beam cross-section can be redirected by planar reflector 14.

The necessary amount of offset v of the focal points is determined by the desired diameter of the collimated beam where it the beam intersects planar reflector 14, the desired length of planar reflector 14, and the losses acceptable in the concentration level of the beam cross-section reflected from reflector 12 at the highest sun elevations. For example, with the sun at maximum elevation and a 9-inch diameter collimated beam, nearly 100% of the beam will intersect the surface of a planar reflector of practical size, e.g., of 5.5' length in a 15° offset focal point system. For a 12-inch diameter beam with the same offset and a planar reflector 5.5-feet in length, there is approximately a 15% loss in the reflected beam when the sun is at zenith. A conventional (i.e., non-offset) prime focus collector of similar three-reflector design would have sipnificantly treater losses at solar elevations close to or at the zenith.

After the collecting area of primary reflector 10, focal length, and degree of downward offset are selected, along with the desired diameter for the collimated beam, the values are input to a standard optical engineering program which calculates and optimizes the primary and secondary reflectors' aspheric coordinates for maximum performance.

As shown in FIG. 3, reflector 10 includes a plurality of hydroformed aluminum reflector panels 18 fastened to an underlying supporting framework (not shown). As shown in FIG. 2, the proximal ends 20E, 22E, respectively, of counterweighted support arms 20, 22 are attached to the back of the primary reflector 10, and pivot on a shaft 24 which is symmetric about center-line 21 and supported by two vertical side supports 26 and 28. Thus, center-line 21 is the pivoting axis of assembly 102.

Referring to FIG. 2, an elevation linear actuator 29, attached between side support 28 and support arm 22, actuates the primary/secondary reflector. assembly 102 to track the sun in elevation, or any other non-terrestrial sunlight source. Many commercially available linear actuators are suitable, including the 18-inch Maxi 8500 with a 36-volt dc motor, available from Venture Manufacturing Co. of Dayton, Ohio.

Referring again to FIGS. 1, 2 and 3, planar reflector 14 pivots about an axis 14A parallel to and centered over aperture 40 of turntable 42 which rotates primary/secondary assembly 102 in azimuth. Planar reflector 14 is rigidly attached to a support structure 80 which is rigidly attached to and rotates with shaft 24. Front reflecting surface 14S of reflector 14 intersects and is in the same plane as pivoting axis 14A, which coincides with the pivoting axis 21 of support arms 20 and 22. Thus, the pivoting axis 14A of planar reflector 14 is centered on and intersects the optical axis 15 of the beam reflected by secondary reflector 12. As arms 20 and 22 pivotally rotate at an angular rate which enables primary reflector 10 to elevationally track the sun, planar reflector 14, attached to shaft 24, is driven by a planar reflector gear motor 36 to pivotally rotate at one-half that angular rate. Because the collimated beam of light from secondary reflector 12 is centered between and parallel to arms 20 and 22, the beam is synchronously maintained in substantially vertical alignment through the center of turntable aperture 40 as the arms rotate. Such beam orientation is not mandatory, but is compatible with preferred planar reflector actuation means. Planar reflector 14 is thus continually adjusted to redirect the beam reflected from secondary reflector 12 in a substantially constant orientation through aperture 40, independent of the elevation of assembly 102.

Figure 6:
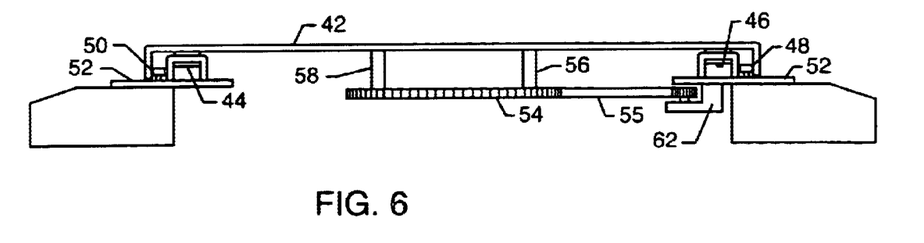
FIG. 6 is an elevational view of a turntable shown in FIGS. 1, 2 and 3, including a base, and drive assembly.

Referring to FIGS. 2 and 6, bottom ends 26E, 28E, respectively, of side supports 26 and 28 attach to turntable 42 which rests on four equally spaced roller bearings, of which two, 44, 46, are shown in FIG. 6. Ends 26E. 28E are held in alignment by four equally spaced lateral bearings fixed to the turntable base 52, of which two, 48, 50, are shown in FIG. 6. Turntable drive sprocket 54 is attached to turntable 42 with four stand-offs, of which two. 56, 58, are shown in FIG. 6, and extends through turntable base 52. Turntable 42 base 52 and aperture 40 are each sufficiently large in diameter to allow transmittance of ambient light into a sky window 60 (see FIG. 5) during periods of reduced direct solar radiation.

Referring to FIGS. 1 and 6, a turntable azimuth drive-gear motor 62 is operatively connected to a sun-tracking device 32. Many commercially available motors are suitable for motor 62, including Model 5NG28 available from Grainger Co. of Long Beach, Calif. Sprocket 54 is driven by a chain 55 which is operatively linked to motor 62 so that turntable 42 is annularly rotatable, and the collimated beam is directed in a substantially constant orientation in the horizontal plane, independent of the sun's changing azimuth.

Sun-tracking Methods and Devices

There are a number of commercially available devices suitable for tracking the sun and controlling solar collector alignment. Such devices may be classified either as predictive or active. A predictive device uses a microprocessor to store and/or compute azimuth and elevation coordinates for the primary reflector. An active device utilizes sensors which in real time detect changes in the sun's position by continually measuring the radiation incidence angle at the primary reflector. A predictive device may be preferred in applications where high accuracy sun-tracking is important, such as the present invention where used for long distance distribution. Preferably, device 32 separately tracks the sun in elevation and azimuth. As shown in FIG. 1, device 32 is attached to support structure 13 proximate to secondary reflector 12. Referring to FIGS. 1 and 2, device 32 is powered by a battery 34 which is charged by a photovoltaic panel 38 attached to primary reflector 10. Device 32 includes integral motor drivers which drive linear actuator 29 and azimuth drive motor 62 to adjust the orientation of elevation arms 20, 22, thereby maintaining alignment of primary reflector 10 with the sun. When utilizing a predictive device, linear actuator and azimuth drive motors integrate position sensors.

Beam-expanding Secondary Reflector

Figure 7:
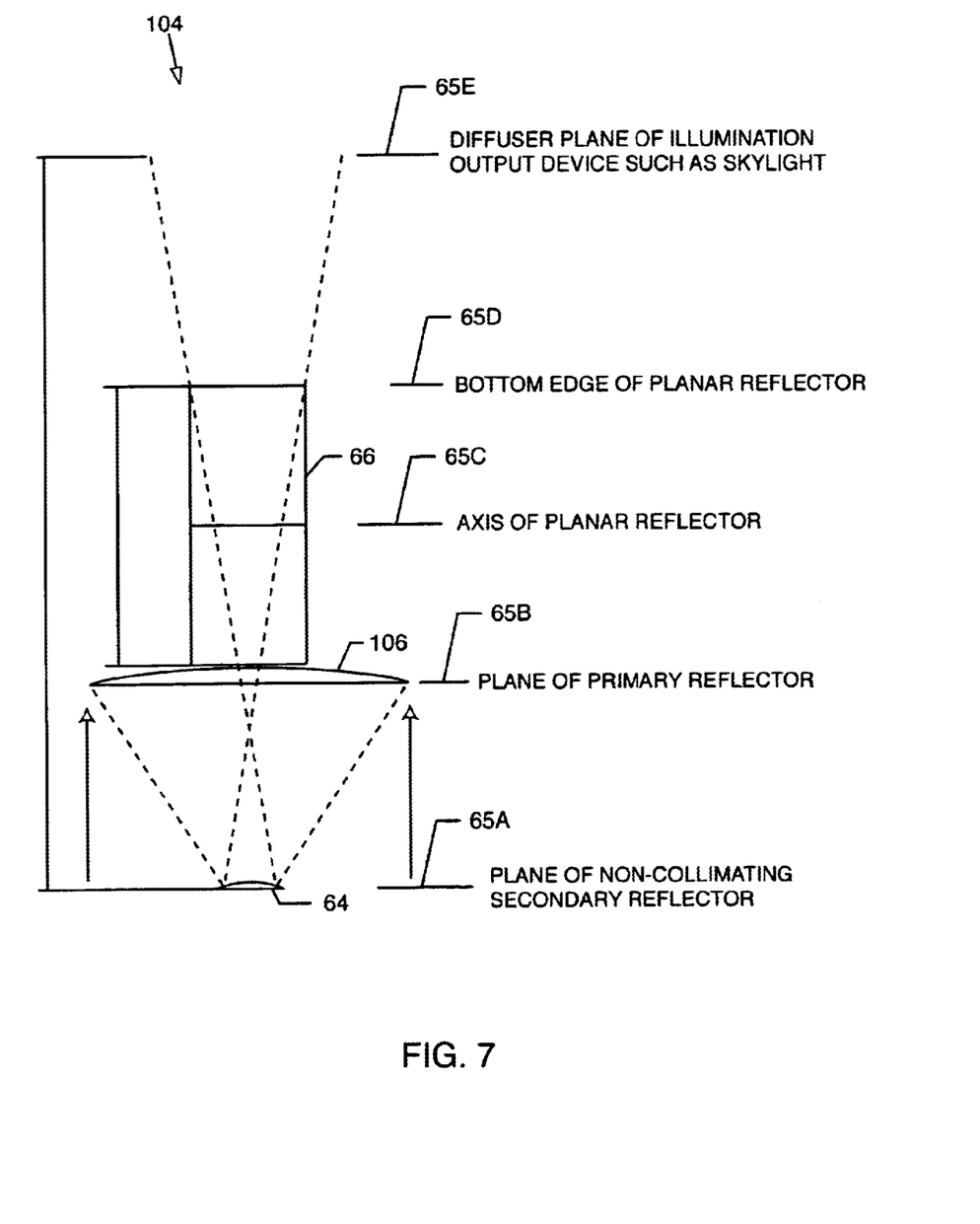
FIG. 7 schematically shows the configuration of the primary, secondary and planar reflectors and resultant beam divergence when a non-collimating secondary reflector is used, according to a second embodiment of the collection system.

FIG. 7 schematically shows a second embodiment of a solar collection system 104 according to the invention, including a primary reflector 106, a planar reflector 66, and a non-collimating secondary reflector 64 which causes a concentrated beam to first condense and then expand for more efficient distribution in non-collimated beam applications such as illumination of a building with a high ceiling, such as an aircraft hangar, where the full output of the collection system is diffused through a single skylight without further distribution. Parallel lines 65A, 65B, 65C, 65D, 65E indicate the relative spacing between each successive optical component, the figure showing significant beam expansion over a relatively short distance.

Although secondary reflector 64 can be configured to perform with primary reflector 10, an alternative primary reflector 106 is indicated to signify that a different optical shape would be needed to get an expanding beam. Beam expansion can also be obtained by using a collimating secondary reflector and modifying the shape of the primary reflector. The focal length of secondary reflectors 64, 106 can be selected to minimize the beam diameter at any point in the distribution system, such as where the beam enters a building, allowing the benefit of smaller roof penetrations; or where it intersects planar reflector 66, allowing for complete reflection by planar reflector 66 at all but the highest sun elevations. Planar reflector 66 is identical in construction to planar reflector 14, except for additional width to accommodate more of the expanded beam. The resulting divergence or expansion of the beam can be largely corrected, if desired, by a concave lateral reflector 110 (see FIG. 5) which further collimates or focuses the beam, or by a condensing lens. A beam-expanding secondary reflector can also improve the performance of a prime focus collector.

Reflective Surfaces

Various reflecting surfaces including glass mirror and enhanced reflectivity aluminum sheeting may be used for solar collectors, but none is without deficiencies. The innovative assembly, geometry and combination of complementary materials and coatings in the invention provides higher output and greater durability than has heretofore been achieved.

A significant advantage of the invention is provided by use of a multi-layer polymeric, dielectric reflecting material for surface 14S and the reflecting surfaces of reflectors 10 and 12, such as the preferred RADIANT LIGHT FILMS® developed and distributed by the Specialty Film Division of Minnesota, Mining and Manufacturing Company (3M) of St. Paul. Minn.

The material eliminates the large surface reflection losses at high incidence angles typical of second surface reflectors materials such as a glass mirror.

Use of a dielectric reflecting material also allows substantial removal of the undesirable infrared component of solar radiation when building illumination is the end use of the collected light. This is because of the material's high infrared transmittance at off-axis incidence angles.

In water heating and other applications where maximum energy transmission is desired, a full spectrum metallic reflective material is preferred for the reflecting surfaces.

Spectral Separation Considerations

The multi-layer dielectric material reflects the visible light spectrum of 400–700 nm at all incidence angles. At normal incidence the reflectance of the infrared spectrum extends to just beyond 1000 nm. An observed, but unadvertised, property of this material is its more efficient transmittance of the infrared spectrum at non-normal incidence angles, where the film reflects only up to about 800 nm at approximately 45–60° incidence, although solar infrared radiation extends beyond 1200 nm. Due to the resulting improved infrared transmittance at non-normal incidence angles, the material acts as a very effective cold mirror (i.e., a visible light reflecting, heat passing mirror) when used for the planar reflector 14. Use of a dielectric reflecting material thus allows planar reflector 14 to perform two functions: redirecting the beam from secondary reflector 12; and spectrally separating the undesirable infrared radiation without requiring additional transmission-reducing filtering elements.

Spectral Separation and Reflective Film Substrates

Building codes and energy efficiency goals increasingly emphasize demand for lower solar heat gain from windows, skylights and other daylighting fixtures. Reflective films are typically laminated to an aluminum sheet substrate which can then be formed into various shapes for luminaire reflectors or tubular skylights, for example.

Aluminum and other metals which have very high reflectance of the infrared solar spectrum, when used as the supporting substrate for an infrared transmitting/visible light reflecting materials reflects heat initially passed through the film, back through the film and into the collection system/ building airspace, causing increased loads on air conditioning equipment.

This undesirable heat reflection and transmission is remedied in the invention by a transparent infrared-passing supporting substrate underlying the reflective film, such as glass for secondary reflector 12, and heat absorbing materials or coatings (e.g., black-painted impregnated or anodized) for primary reflector 10 and planar reflector 14. Preferably the substrate for planar reflector 14 is black-painted, tempered float glass. Preferably, the substrate for primary reflector 10 is black anodized aluminum. A heat absorbing substrate removes substantial portions of the infrared spectrum in sunlight collection devices, allowing the heat to be sinked, insulated or radiated away from the collection system and building workspace.

Use of transparent and heat absorbing substrates is also effective for spectrally separating heat in daylighting applications using tubular skylights, light pipes and/or angled light wells.

Concentrator Photovoltaic Applications

Although a non-transparent (e.g., black-painted) heat absorbing substrate for secondary reflector 12 will work well in many daylighting applications, the substrate used for secondary reflector 12 preferably is heat resistant, transparent, anti-reflection coated, slump-formed glass. Infrared-sensitive concentrator photovoltaic cells or similar devices converting thermal energy into electrical energy can then make effective use of the infrared portion of the solar radiation spectrum. In such collector configurations a full spectrum reflective material is used for primary reflector 10.

Reflective Surface Durability

Many years of government and commercial research have failed to produce a cost-effective and durable highly specular reflecting material for solar energy applications. Outdoor weatherability and cleaning of the material without damage also continues to be unsolved problems. RADIANT LIGHT FILM®, if utilized unmodified in the invention, has UV degradation problems, static dust attraction, poor weatherability, and ineffective abrasion resistance resulting in damage during cleaning. For these reasons, this material is not approved or marketed by 3M for outdoor use in solar concentrator applications.

The most effective current method to protect reflecting surfaces in solar collectors from weathering is enclosing the reflectors in a plastic cover. The disadvantage of this method is additional surface reflection losses caused by the difference in refractive index between air and the plastic material used for the enclosure. This problem is solved in the invention by applying an aliphatic polyurethane clear coating to the reflective film, making a plastic enclosure unnecessary When formulated with UV absorbers such coatings are commonly used as a gloss clear coat for vehicle paints. Polyurethanes have a refractive index that is close enough to that of plastics used in dielectric and other reflective films, that they impart significantly less surface reflection losses than other protective coatings or enclosures.

When applied to the reflective film, a polyurethane coating provides the additional necessary properties of durable UV resistance, weatherability, chemical resistance, minimal electrostatic dust attraction, and ease of cleaning without damage to the reflective surface.

Distribution and Utilization Considerations

Referring to FIG. 5, after passing through turntable aperture 40 the condensed beam transits roof sky window 60, before being distributed and utilized inside a building. Windowpane 68 of sky window 60 includes a first layer of anti-reflection coated glass (preferably LUXAR®, available from Abrisa Glass and Coatings of Santa Paula, Calif.) having a hot mirror coating on its bottom side that absorbs residual portions of the infrared spectrum, thus preventing this heat from entering the building.

A seasonally removable metal frame having an anti-reflection coated, heat reflecting plastic film 70 is suspended under sky window 60, enclosing air space providing additional insulating properties with minimal reduction of visible light transmission.

Obvious means of distributing such a condensed beam are light pipes or fiber optics. These distribution means however are not ideal because of component expense, absorption by transmissive materials, and losses due to multiple surface reflections. The distribution means according to the invention described below allows eliminating light pipes or fiber optics for distributing sunlight, as well as the associated losses of these elements.

Distribution System

Figure 8:
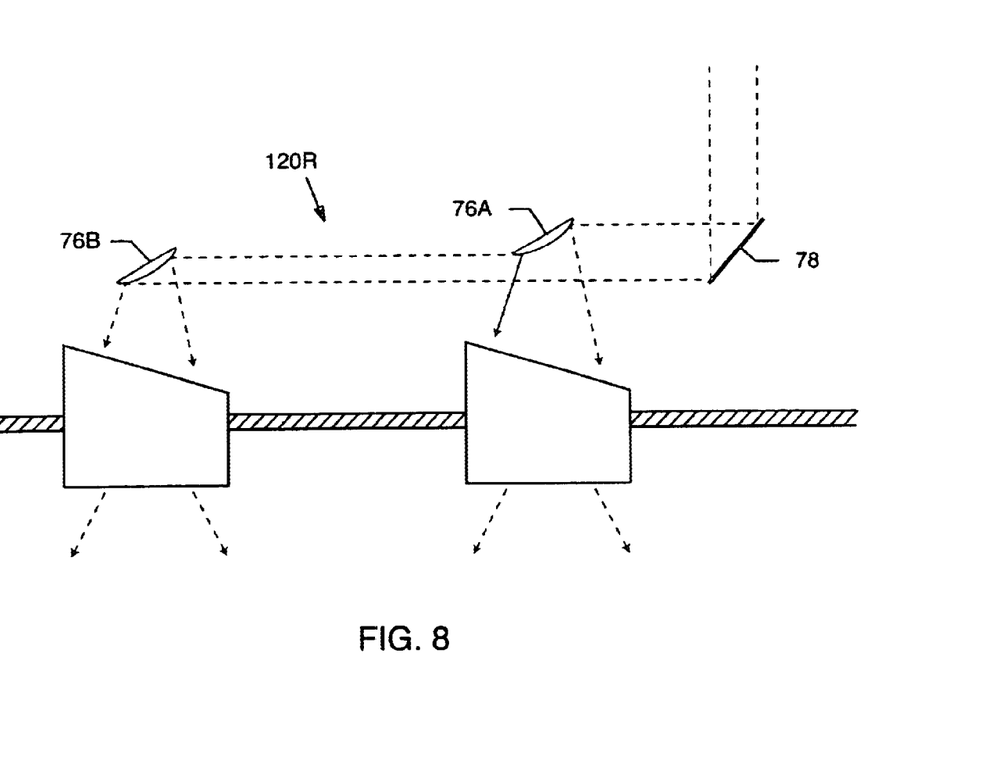
FIG. 8 schematically shows a rooftop distribution system for distributing sunlight collected by the FIG. 5 or FIG. 7 collection system.

The sun, subtending an average of 0.53 degrees of arc, is not a point source of light. Because of this, and irregularities of the reflecting surfaces, there will be significant inherent divergence or de-collimation of the condensed beam of sunlight. True collimation is not possible given such parameters. Referring to FIG. 5, undesirable divergence in a ceiling-mounted distribution system 120C is minimized by a concave lateral reflector 110 which condenses the beam by providing additional collimation or focusing, as desired, and directs the beam, which is generally parallel to ceiling 122, to convex reflectors 74 and 72. Progressive cross-sections are reflected downwardly by reflectors 74 and 72 Beam-condensing lateral reflector 110 is computer designed using standard optical engineering software to match the beam divergence at the desired point of lateral reflection. Reflector 110 performs two functions: condensing and redirecting the beam along a ceiling or roof; and limiting surface reflection lossses because only one additional optical element has been added. FIG. 8 shows a rooftop distribution system 120R wherein a planar lateral reflector 78 directs a beam toward convex reflectors 76A and 76B. A rooftop distribution system allows higher beam concentration levels to be distributed outside a building where fire and other potential hazards can be minimized. A planar lateral reflector can be used in both building-intenor and building-exterior configurations where total distribution distances are relatively short so that further collimation or focusing of the beam is unnecessary.

Thus, a solar radiation collection and distribution system according to the invention further includes a distribution system including a lateral reflector and a plurality of downwardly reflecting reflectors.

For multi-story applications where the beam travels extended vertical distances, one or more condensing lenses may be added to the optical path at any point beyond the planar reflector, to keep the beam divergence within the desired range.

This invention is not to be limited by the embodiments shown in the drawings and described in the description which are given by way of example and not of limitation, but only in accordance with the scope of the appended claims.

What is claimed is:

1. A solar radiation collection and distribution system comprising a solar collection system comprising:

a primary reflector having an aperture therethrough;

a secondary reflector for redirecting, in a concentrated beam, radiation received from the primary reflector along an optical axis through said aperture, the primary and secondary reflectors rigidly disposed in a pivotable assembly, the beam having an exit angle with respect to said assembly different than the incidence angle of solar radiation incident on the primary reflector;

means for pivoting said assembly in elevation at an angular rate such that the primary reflector continuously tracks the sun;

means for annularly rotating said assembly such that the primary reflector continuously tracks the sun azimuthally; and a pivotable planar reflector for receiving and reflecting downwardly the beam received from the secondary reflector, the planar reflector pivoting about a pivoting axis at one-half said angular rate, said downwardly reflected beam consisting essentially of sunlight and maintained in a substantially constant vertical and horizontal orientation independent of the elevation and azimuth of said assembly.

2. The solar radiation collection and distribution system according to claim 1 wherein said primary reflector is concave and said secondary reflector is convex.

3. The solar radiation collection and distribution system according to claim 1 wherein said optical axis of said concentrated beam intersects said pivoting axis of said planar reflector.

4. The solar radiation collection and distribution system according to claim 1 wherein said primary reflector has a focal point offset from a central prime focus, first optical axis by a predetermined number of degrees, and said secondary reflector has a focal point offset from said first axis by said number of degrees, said focal points disposed along a second optical axis.

5. The solar radiation collection and distribution system according to claim 1 wherein said assembly and planar reflector pivot independently about a common axis.

6. The solar radiation collection and distribution system according to claim 1 wherein said concentrated beam redirected by the secondary reflector is substantially collimated.

7. The solar radiation collection and distribution system according to claim 1 further comprising a distribution system comprising a lateral reflector which reflects the beam reflected from the planar reflector.

8. The solar radiation collection and distribution system according to claim 7 wherein said lateral reflector is concave and further collimates said beam.

9. The solar radiation collection and distribution system according to claim 7 wherein the distribution system further comprises a plurality of reflectors, each reflecting downwardly a portion of the beam reflected from said lateral reflector.

10. The solar radiation collection and distribution system according to claim 1 wherein:

said means for pivoting said assembly in elevation at said angular rate comprises a sun-tracking device operatively connected to and driving a linear actuator attached between a side support of the solar collection system and a support structure attached to the back of the primary reflector; and said means for annularly rotating said assembly comprises said sun-tracking device operatively connected to and driving an azimuth drive-gear motor operatively linked to a turntable on which said assembly is mounted.

11. The solar radiation collection and distribution system according to claim 1 wherein said secondary reflector causes the concentrated beam reflected therefrom to first condense and then expand.

12. The solar radiation collection and distribution system according to claim 1, further comprising:

means for reducing surface reflection losses at high solar radiation incidence angles at the primary, secondary and planar reflectors;

means for reducing weathering of and damage from ultraviolet radiation to the primary, secondary and planar reflectors; and means for separating a portion of the infrared solar radiation from the visible component at the primary reflector, secondary reflector and planar reflector.

13. The solar radiation collection and distribution system according to claim 12 wherein:

said means at said planar reflector for reducing surface reflection losses comprises a reflecting surface comprising a multi-layer polymeric, dielectric material;

said means, at each reflector, for reducing weathering and ultraviolet radiation damage comprises a polyurethane clear coating over said reflecting surface;

said means for separating a portion of the infrared solar radiation at the primary reflector comprises a first infrared-absorbing substrate underlying said dielectric material;

said means for separating a portion of the infrared solar radiation at the secondary reflector comprises a transparent infrared-passing substrate underlying said dielectric material; and said means for separating a portion of the infrared solar radiation at the planar reflector comprises a second infrared-absorbing substrate underlying said dielectric material.

14. The solar radiation collection and distribution system according to claim 13 wherein:

said first infrared-absorbing substrate is black anodized aluminum; and said second infrared-absorbing substrate is black-painted, tempered float glass.

15. The solar radiation collection and distribution system according to claim 7 wherein the distribution system further comprises at least one sky window comprising a first layer of anti-reflection coated glass.

16. The solar radiation collection and distribution system according to claim 15 wherein a layer of plastic film is suspended under each sky window and encloses an air space below said coated glass layer.

17. The solar radiation collection and distribution system according to claim 16 wherein said layer of plastic film is disposed within a removable frame.

* * * * *